Figure 3:
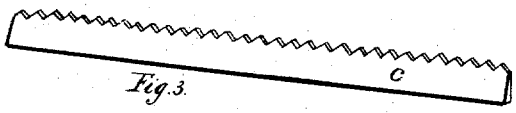
Figure 4:
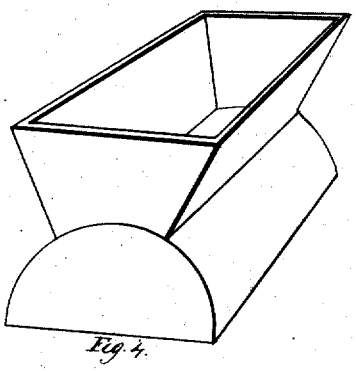
Figure 1:
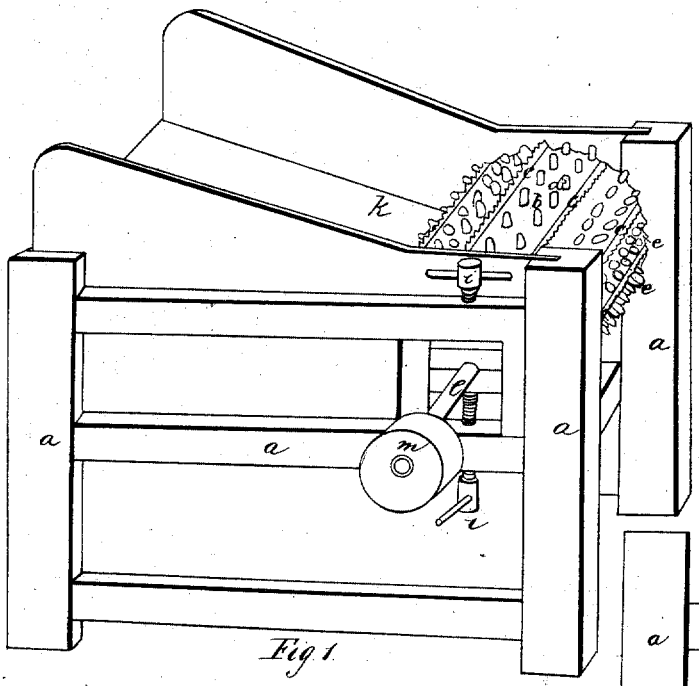
Figure 2:
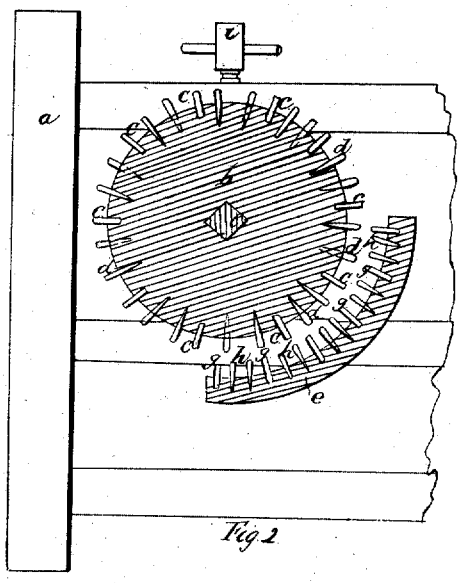

7324X

J. BEVIER.

Thrashing and Grinding Machine.

Patented Dec. 11, 1832.

N. PETERS, Photo-Lithographer, Washington, D. C.

The schedule referred to in these Letters Patent, and making part of the same, containing a description in the words of the said Jesse Benier himself of his improvement in the Machine for thrashing Grain, shelling Corn & grinding Apples.

To all to whom these presents shall come. Be it known that I, Jesse Benier, of [illegible], in the County of Cayuga & State of New York, have invented a new and useful improvement in the Machine for Thrashing wheat & all other kinds of grain & seed, & for the shelling of corn and grinding Apples; and that the following is a full and exact description of the construction & operation of the said Machine as invented or improved by me.

This Machine is constructed by a frame of wood of a size to suit the power to be applied, but a size suitable to be drove by two horses, is two feet & six inches wide, about 3 feet long, & from two feet to 30 inches high with a cylinder of iron or wood long enough to fill the width of the frame, with bars of iron from one and a half to two inches wide, & about three eighths of an inch thick, these bars are to be let edgeways into the cylinder about half the width of the bar & the outer edge chamfered down on one side to the thickness of one eighth of an inch thick, with the surface of the bars smooth or teethed, about like hand saw teeth, these bars to be placed on the cylinder from five to seven inches apart round the surface of the cylinder, & between each two bars two straight rows of iron spikes, drove or fastened into the cylinder from one end to the other, from two to three inches apart in each row, & the rows about one inch apart: the spikes in the second row to stand opposite to the space of the first, & so on interchangeably round the surface of the cylinder; the spikes may be round or square, & from one fourth to three eighths of an inch in diameter, & must extend about as far from the surface of the cylinder as the bars on the cylinder; the size of the cylinder must be proportioned to the velocity to be given.

A twelve inch cylinder should be so geared as to give about [illegible] revolutions in a minute; a bottom is formed for a concave of iron or wood, on which is placed square bars of iron from five eighths to three Drawing — fourths of an inch in diameter, or flat bars set up edgeways from two to three
inches apart, beginning about as high as the centre of the cylinder, & passing
under the bottom of it, about one fourth way round, & near enough to suit the
grain to be thrashed, with from two to four straight rows of round or square
spikes to be drove or fastened between each two concave bars; the spikes
in each row about three fourths of an inch from each other, and each
two rows to be about the same distance apart. The spikes in the concave
may be about the same size of the spikes in the cylinder. If the spikes in
the cylinder or concave are of a large size, the outer ends may be nearly
sharp; those in the concave may extend about as high as the surface of
the concave bars, & the spikes in each second row to stand opposite the space
in the first; the cylinder being suspended by friction or plain boxes so as
to raise it from or let it near the concave as occasion may require by
means of nuts & screws; the concave may be stationary, or may be so con-
structed as to spring down when hard pressed from one fourth to one half
an inch An inclined plane or box is placed on the back part of the frame
the forward part of which comes close to the first bar of the concave, to
conduct the grain or corn in between the cylinder & concave.

The shaft of the cylinder extends thro' side of the frame far enough
to admit of a small whirl made fast, to apply a band from a drum or
wheel to put the machine in motion. The grain is drawn in by the
bars & spikes on the cylinder over the surface of the concave bars, &
over and between the spikes in the concave.

A machine for grinding apples may be of a size to suit the power to
be applied, but a size suitable to be drove by one horse, may be from one
to two thirds as wide as the machine above described, with the bars & spikes
of the cylinder & concave extending about half as far from the surface
of the cylinder & concave as described in the above machine. With the
machine part boxed or covered over, & a box or hopper placed over the
cylinder so as to conduct the apples in between the cylinder & concave.
What is claimed by this improvement, is the bars & spikes of
the cylinder, acting upon the grain, over the concave of bars [illegible] [illegible]

7324x Dec 11, 1832 639.

ron & between the spikes in the concave at the same time, & also the application of the machine in grinding apples.

Witnesses

John Shaw Jr.

Morgan Shaw

Jesse Brown

Fyd. Hyde.

(1000 rds)

Patented December 11. 1832.